US010678851B2

(12) United States Patent
Tcherechansky et al.

(10) Patent No.: US 10,678,851 B2
(45) Date of Patent: Jun. 9, 2020

(54) COGNITIVE CONTENT DISPLAY DEVICE

(71) Applicant: International Business Machines Corporation, Armonk, NY (US)

(72) Inventors: Nicolas Tcherechansky, Buenos Aires (AR); Nicolas M. J. Torcasio, Buenos Aires (AR); Nicolas O. Nappe, Buenos Aires (AR); Facundo J. Tomaselli, Ramos Mejia (AR); Gaston A. Rius, Buenos Aires (AR); Federico T. Gimenez Molinelli, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 15/962,321

(22) Filed: Apr. 25, 2018

(65) Prior Publication Data
US 2019/0332694 A1 Oct. 31, 2019

(51) Int. Cl.
*G06F 16/23* (2019.01)
*G06F 16/58* (2019.01)
*G06F 16/632* (2019.01)
*G06F 21/62* (2013.01)
*G06N 3/08* (2006.01)

(52) U.S. Cl.
CPC ...... *G06F 16/5866* (2019.01); *G06F 16/2365* (2019.01); *G06F 16/634* (2019.01); *G06F 21/6218* (2013.01); *G06N 3/08* (2013.01)

(58) Field of Classification Search
CPC ............. G06F 16/2365; G06F 16/5866; G06F 16/634; G06F 21/6218; G06N 3/08
See application file for complete search history.

(56) References Cited

U.S. PATENT DOCUMENTS

| 7,676,369 | B2 * | 3/2010 | Fujimoto | G10L 15/22 |
| | | | | 704/270 |
| 8,311,839 | B2 | 11/2012 | Chen et al. | |
| 9,014,510 | B2 | 4/2015 | Fedorovskaya et al. | |
| 9,313,318 | B2 | 4/2016 | Jonsson et al. | |
| 9,521,175 | B2 | 12/2016 | Rogers | |
| 2014/0130076 | A1 * | 5/2014 | Moore | H04N 21/25883 |
| | | | | 725/19 |
| 2015/0339321 | A1 | 11/2015 | Butler et al. | |
| 2016/0055235 | A1 * | 2/2016 | Zhang | G06Q 50/01 |
| | | | | 707/749 |
| 2016/0300135 | A1 * | 10/2016 | Moudy | G06N 3/0445 |
| 2017/0351680 | A1 * | 12/2017 | Selekman | G06Q 30/0207 |
| 2018/0032611 | A1 * | 2/2018 | Cameron | G06F 40/211 |

OTHER PUBLICATIONS

Cambria, Erik, et al., "New Avenues in Opinion Mining and Sentiment Analysis", Mar./Apr. 2013, IEEE Intelligent Systems, vol. 28, Issue 2, pp. 15-21. (Year: 2013).*

* cited by examiner

*Primary Examiner* — Scott A. Waldron
(74) *Attorney, Agent, or Firm* — Daniel C. Housley (57) ABSTRACT

A voice input may be received, and from the voice input, a topic may be identified. A sentiment score for the topic may be generated using sentiment analysis on the voice input, and the sentiment score may reflect an individual's reaction to the topic. The sentiment score may be compared to a sentiment threshold. In response, one or more images may be selected, based on the topic, from an image database. The one or more images may be validated, and then displayed.

20 Claims, 7 Drawing Sheets

COGNITIVE CONTENT DISPLAY DEVICE

BACKGROUND

The present disclosure relates generally to cognitive computing, and more particularly to cognitive content display devices.

Digital image display devices may display a single image, a slideshow of images, or one or more videos. Once the owner of the device selects the content to be displayed, the device displays that content, without any consideration to environmental context, such as, for example, the potential audience. Traditional devices are limited in their ability to identify persons in proximity to the device, as well as in their ability to selectively display content.

SUMMARY

Embodiments of the present disclosure include a method, computer program product, and system for using a cognitive image display device to selectively display content (e.g., images, slideshows, videos, etc.).

A voice input is received. From the voice input, a topic is identified. A first sentiment score for the topic is generated using sentiment analysis on the voice input; the sentiment score reflects a first user's reaction to the topic. Based on the first sentiment score, it is determined that a sentiment threshold has been met. One or more images are selected, based on the topic, from an image database. The one or more images are validated. In response to the validation, the one or more images are displayed.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cognitive computing, and more particularly to cognitive content display devices. While the present disclosure is not necessarily limited to such applications, various aspects of the disclosure may be appreciated through a discussion of various examples using this context.

An owner of a cognitive content display device (e.g., digital photo frame, tablet, smart television, etc.) may possess, or have access to, a gallery of content (e.g., images, videos, sound clips, etc.) they wish to display and/or share with various visitors. However, the owner may prefer to selectively display pieces of content (e.g., individual images, videos, etc.), depending on which visitors may be present, depending on the topic of conversation, and further depending on the tone of the conversation. In other words, an owner may want the images displayed to correlate to the conversation topic and to be appropriately suited to their visitor(s), but the owner may simultaneously not want certain images to be displayed when particular visitors are present, or when the present visitor dislikes the topic of the current conversation. A cognitive content display device may be capable of taking the owner's wants into consideration and automatically selecting content for display. In embodiments, the content may be selected and validated to ensure that any viewers will react positively. For example, if a particular visitor dislikes outdoor activities, images of nature, hiking, camping, etc. (e.g., images in the gallery with metadata tags related to "outdoor activities") may not be displayed when that particular visitor is present, even if those activities come up in conversation. In another example, the owner may want certain content to remain undisplayed, even if the visitor's sentiment on the topic is positive.

Traditional display devices would require the owner to manually adjust the images in the gallery (e.g., add or delete images to or from the gallery) each time the conversation topic changes, as well as in response to each visitors' tastes and reactions. These modifications may need to be visitor-specific as well, in that they could be changed each time a different visitor came into proximity with the cognitive content display device. In social settings with multiple visitors, this may easily become an overwhelming and unmanageable task.

In embodiments, natural language processing (NLP) techniques may be employed to enable a cognitive content display device to "listen" to, or monitor, ambient conversations. Voice inputs may be processed and transformed into machine-readable data to allow the device to understand the topic of any ambient conversations. The cognitive content display device may further employ sentiment analysis (e.g., via IBM WATSON PERSONALITY INSIGHTS) of the conversation to determine whether the visitor would like potential content, or whether the visitor reacted positively or negatively to displayed content. For example, a visitor reaction could be determined using IBM WATSON PERSONALITY INSIGHTS by determining whether a sentiment score, generated from visitor inputs, meets a sentiment threshold. In some embodiments where sound clips are included in content, NLP may be further used to create metadata tags indicating the composition or subject of the sound clip.

Image analysis techniques may be employed to determine the makeup of any content displayed. For example, facial recognition may be used to identify individuals, image fingerprinting may be used to identify works of art, etc. In embodiments, IBM WATSON IMAGE RECOGNITION may be used to perform image analysis techniques. Processed images and content may include metadata tags to indicate the content and composition of each image, and these tags may be used to populate lookup tables, data trees, relational databases, etc. This may enable, among other things, quick indexing, searching, and retrieval when the cognitive content display device is determining which image(s) and content to display. In embodiments, the cognitive content display device may be further equipped with a camera for capturing the facial features/reactions of visitors, in order to determine, using facial recognition and image analysis techniques, visitors' reactions to displayed content.

The cognitive content display device may identify visitors using one or more methods, such as analyzing voice inputs (e.g., voiceprint recognition). In other embodiments, the cognitive content display device may have access to the owner's calendar and/or smart phone, and may analyze the appointments (e.g., calendar entries), phone calls, texts, etc. to determine if any visitors are expected. In yet other embodiments, the cognitive content display device may recognize electronic signatures (e.g., one or more wireless signals) that are associated with particular individuals. For example, the cognitive content display device may recognize one or more wireless devices (e.g., a FITBIT, smart phone, smart watch, electronic car key, etc.) that belong to a particular visitor. In embodiments, once a visitor is identified, the cognitive content display device may create and store a visitor profile to log, for example, the visitor's electronic signature, sentiment scores, etc. to "remember" data related to the visitor and facilitate, for example, faster visitor identifications and content validation on a particular visitor's subsequent visit. In embodiments, the owner of a cognitive content display device may manually select one or more visitor profiles via a GUI or other interface.

An automatic filtration/validation method may be employed to cause the display device to identify the individuals present (e.g., in proximity of the device), apply a control filter to prevent the display of undesired content, validate the content against a sentiment score generated from visitor-generated inputs, and display only validated content. The filtration/validation method may be supplemented to further confirm sentiment scores against visitor-related social media data, adjust validation/sentiment score generation in response to a visitor's reaction to displayed content, and adjust the validation/sentiment score generation in response to feedback from the owner. In embodiments, a visitor profile, or data from the visitor profile, may be included as part of the control filter.

In embodiments, the gallery to which the cognitive content display device has access may be a single file folder on a particular device, or it may be an aggregate of locations (e.g., file folders). For example, the gallery may be two or more file folders on two or more devices (e.g., digital camera, personal computer, tablet, smart phone, etc.) controlled by the owner. In yet other embodiments, the gallery may be, at least in part, an aggregate of images associated with owner-controlled accounts. For example, the gallery may include images stored on a server or in the cloud, that may or may not have duplicate files on any owner-controlled devices, but are nevertheless associated with the owner's social media accounts (e.g., INSTAGRAM, FACEBOOK, TWITTER, etc.). In yet other embodiments, the gallery may include images associated with a visitor's social media accounts. In yet another embodiment, the gallery may be actively supplemented with images searched for by the cognitive content display device, where the search occurs via a network connection (e.g., the internet), to find images that would likely result in a positive sentiment score. In embodiments, content gathered from sources outside the owner's control (e.g., from internet sites not associated with the owner) may be automatically checked for copyright or other intellectual property ownership rights that may prevent lawful use of the content.

In embodiments, the cognitive content display device may use distance metrics (e.g., EarthMover, Mahalanobis, Euclidian, etc.) or other techniques to compare visitor profiles to extrapolate sentiment scores and "guess" whether, for example, "Visitor A" would like the same, or similar, content as "Visitor B," or a plurality of other visitors. This may be performed using simple comparisons of sentiment scores by topic (e.g., does Visitor A's sentiment score for Topic B meet a comparison threshold when compared to Visitor B's sentiment score for Topic B?), using an aggregation of sentiment scores across several topics to determine an overall personality score, using an aggregation of sentiment scores for a particular topic from a plurality of users, etc.

Figure 1:
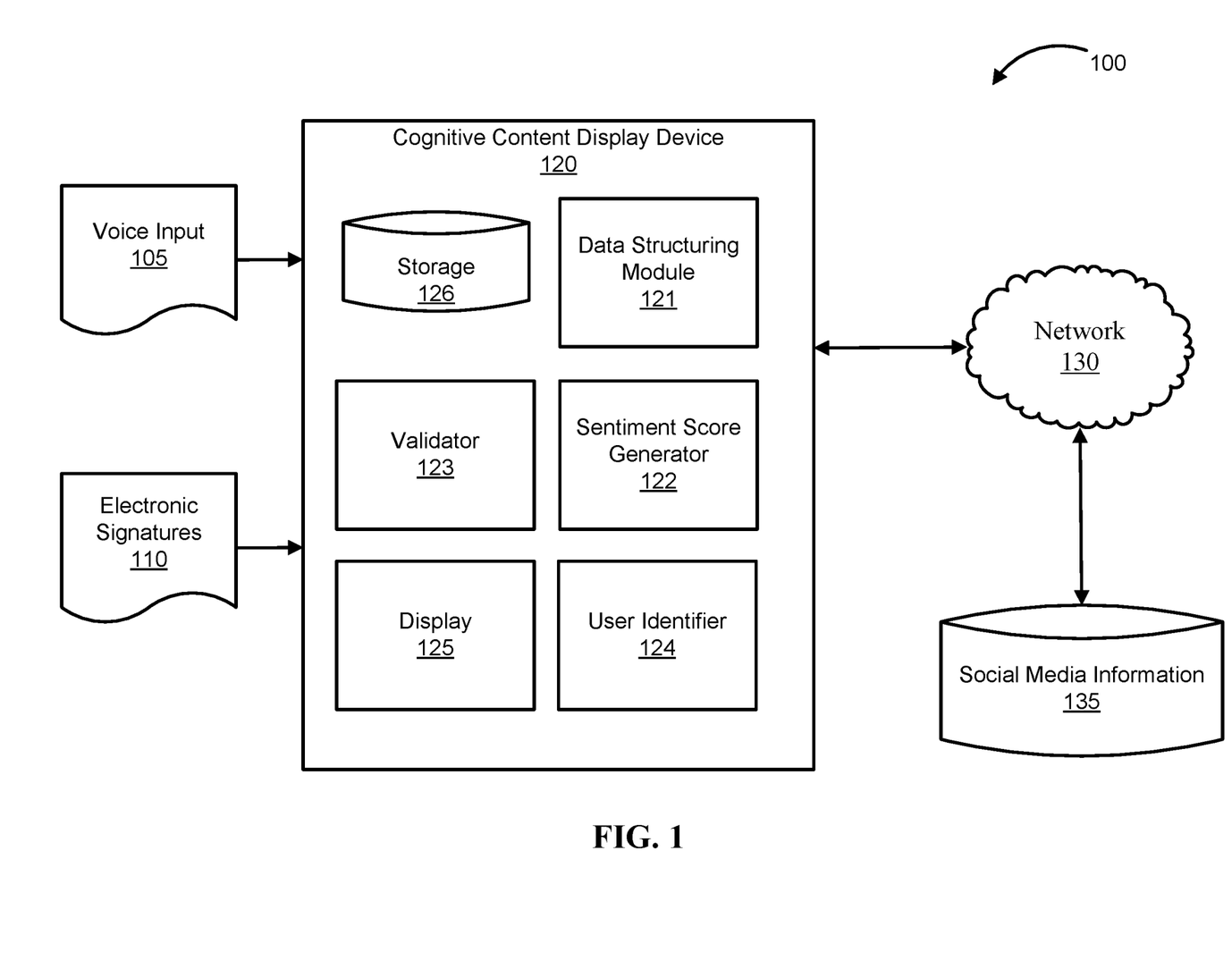
FIG. 1 illustrates a diagram of an example environment for cognitively selecting content for display, in accordance with embodiments of the present disclosure.

Turning now to the figures, FIG. 1 illustrates a diagram of an example environment 100 for cognitively selecting content for display, in accordance with embodiments of the present disclosure.

In example environment 100, embodiments of a cognitive content display device 120 may include a data structuring module 121, sentiment score generator 122, validator 123, user identifier 124, display 125, and storage 126. Embodiments of cognitive contend display device 120 may further include, or be communicatively coupled to, various input/output devices, such as, for example: microphones, cameras, wireless antennas, and/or other input receiving modules (not shown) to capture, for example, voice input 105, image or video input (not shown), and electronic signatures 110. In embodiments, data structuring module 121, sentiment score generator 122, validator 123, user identifier 124, and storage 126 may be located separately from the cognitive content display device 120. For example, data structuring module 121, sentiment score generator 122, validator 123, and user identifier 124 may be located remotely on other devices, as virtualized components in a cloud computing environment, etc. Cognitive content display device 120 may further be communicatively couple to a network 130, and social media information 135.

Network 130 may be any type or combination of networks. For example, the network may include any combination of personal area network (PAN), local area network (LAN), metropolitan area network (MAN), wide area network (WAN), wireless local area network (WLAN), storage area network (SAN), enterprise private network (EPN), or virtual private network (VPN). In some embodiments, the network 130 may refer to an IP network, a conventional coaxial-based network, etc. For example, a server storing social media information 135 may communicate with various client devices (e.g. tablets, laptops, smartphones, portable terminals, cognitive content display device 120, etc.) over the internet.

In some embodiments, the network 130 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 130.

In embodiments, cognitive content display device 120 may receive, via microphone or other suitable input device, voice input 105. Voice input 105 may include, for example, ambient audio samples/streams from the local environment, including audio input from nearby conversations. In embodiments, cognitive content display device 120 may determine, using methods described herein (e.g., NLP techniques), one or more topics of the conversation(s). For example, if a nearby conversation includes a recollection of a recent ski trip, the voice input 105 may embody an audio transcript/recording of the conversation. Voice input 105 may be unstructured, semi-structured, or structured data. Cognitive content display device 120 may further include the components of computer system 701 of FIG. 7. In embodiments, tone and pitch characteristics of voice input 105 may identified for use in sentiment analysis, as described herein.

Data structuring module 121 may receive voice input 105 or other inputs (e.g., video or image inputs) to perform NLP or other data structuring techniques (e.g., image processing, facial recognition, sentiment analysis based on facial features, etc.) to output machine-readable data. Audio input may be structured and analyzed to identify, for example, conversation topics, and visual inputs may be analyzed to identify nearby individuals and their facial features and emotional state (e.g., as a reaction to a conversation topic). The output of data structuring module 121 may include, for example, metadata tags, annotations, parse trees, populated triplestore(s), populated relational database(s), etc. Data structuring module 121 may be substantially similar to data structuring module 201 of FIG. 2.

Sentiment score generator 122 may receive machine readable data, such as the output of data structuring module 121, and output a sentiment score reflecting an individual's like or dislike of a particular topic. In embodiments, sentiment score generator 122 may include, for example, a neural network or other cognitive computing platform, such as a neural network substantially similar to the neural network 400 of FIG. 4. In embodiments, the cognitive content display device 120 may further monitor a visitor's reaction to the displayed content and use the reaction as input to adjust the weights and/or biases of the neural network.

In embodiments, sentiment score generator 122 may receive and/or retrieve, via network 130, information from social media information 135 associated with a particular visitor in order to build a profile of the visitor's interests and likes and determine, in some embodiments simultaneously, a second sentiment score as confirmation of the sentiment score generated based on conversation analyses and topics. In embodiments where the two sentiment scores are created simultaneously, single instruction multiple data (SIMD) operations may be utilized to increase the speed and efficiency with which the sentiment scores are generated and decrease the computing resources needed for the generation of the sentiment scores.

In embodiments, the sentiment scores may include an array of values representing various emotions and intensities. In embodiments, sentiment scores may be coordinates of an "emotional location" in a 2D or 3D model, or even a location on a continuum. A preferred embodiment may include sentiment scores as generated by IBM WATSON PERSONALITY INSIGHTS to represent emotions and personality attributes.

Validator 123 may be responsible for validating various content for display. In some embodiments, this may include comparing a sentiment score of a conversation topic to a threshold to determine whether a particular piece of content should be displayed. For example, if a conversation includes the topic of neo-gothic architecture, and the visitor dislikes neo-gothic architecture (e.g., the sentiment score generated from the visitor's voice input(s) does not meet a sentiment threshold), then the cognitive content display device 120 may prevent any content with is related to neo-gothic architecture from being displayed. Cognitive content display device 120 may determine whether the content is related to neo-gothic architecture using image analysis and/or NLP techniques, as described herein.

In embodiments, the content may be prevented from being displayed by adjusting a visitor's "viewing privileges," which may be stored in the visitor's profile. In embodiments, the owner of the cognitive content display device 120 may manually adjust the viewing privileges of particular visitors directly, in order to prevent the display of certain content in the presence of particular visitors, regardless of any sentiment analysis.

In embodiments, the owner of the cognitive content display device 120 may input feedback or performance ratings (e.g., 1-5 stars or another rating scheme) subsequent to, or in tandem with, a conversation. The feedback may be used to adjust the sentiment threshold up or down, as appropriate. For example, a 1-2 star rating may indicate an upward adjustment of a sentiment threshold, in order to require a greater sentiment value for content validation (e.g., a visitor's sentiment score for a topic must be greater in order to allow related content to be displayed, thus increasing the likelihood of a positive reaction to the displayed content); alternatively, a 4-5 star rating may indicate a downward adjustment; and a 3-star rating may indicate no adjustment is necessary. In embodiments, the feedback may be used to adjust weights and biases in the neural network. In embodiments, feedback adjustments may "degrade" over time. In other words, the impact of feedback on the threshold or the weights/biases may lessen over time, or may even disappear altogether after the passage of a certain length of time to adapt to the owner's evolving tastes and/or to account for the owner's change in mood.

In embodiments, content validation may further include comparing a sentiment score generated from voice input 105 to a sentiment score generated from a visitor's social media information 135 to more accurately assess a visitor's true sentiment for a particular topic (e.g., to determine whether a sentiment confirmation threshold has been met). In embodiments, the comparison may involve statistical comparisons, distance metrics, etc. to determine whether the sentiment confirmation threshold has been met.

In some embodiments, cognitive content display device 120 may preemptively validate, via validator 123, content for display to a particular visitor. For example, validator 123 may use distance metrics (e.g., EarthMover, Mahalanobis, Euclidian, etc.) or other techniques to compare visitor profiles to extrapolate sentiment scores and approximate whether, for example, "Visitor A" would like the same, or similar, content as "Visitor B," or a plurality of other visitors. This may be performed using simple comparisons of sentiment scores by topic (e.g., does Visitor A's sentiment score for Topic B meet a comparison threshold when compared to Visitor B's sentiment score for Topic B?), using an aggregation of sentiment scores across several topics to determine an overall personality score, using an aggregation of sentiment scores for a particular topic from a plurality of visitors, etc.

User identifier 124 may allow cognitive content display device 120 to determine which individuals and visitors are proximate to the device. In embodiments, this may include monitoring, via a camera or microphone, the local environment and identifying any individuals present using voice-print identification techniques or facial recognition techniques. In embodiments, user identifier 124 may employ background filtering methods to account for background interference (e.g., background noise, low lighting, background electronic signals, etc.) when identifying a user (e.g., a visitor). In embodiments, user identifier 124 may access the owner's calendar or other appointment tracking device or software to determine whether the owner is expecting any visitors, and when the visitor(s) will be present.

In embodiments, a visitor may be identified using electronic signatures 110 associated with that particular visitor. As described herein, the user identifier 124 may recognize electronic signatures 110 (e.g., one or more wireless signals that contain unique, device-specific identifiers) that are associated with particular devices. For example, the user identifier 124 may recognize an internet protocol (IP) address, media access control (MAC) address, serial number, etc. of one or more wireless devices (e.g., a FITBIT, smart phone, smart watch, electronic car key, etc.) that belong to a particular visitor. In embodiments, once a visitor is identified, the cognitive content display device 120 may create and store (or amend, if a visitor already has a profile) a visitor profile to log, for example, the particular visitor's electronic signature, sentiment scores, etc. A particular visitor's electronic signature may include a combination of unique identifiers from a plurality of devices, and the visitor may be positively identified, in some embodiments, when fewer than the total plurality of the visitor's associated devices are detectable.

Display 125 may include any visual or audio output component appropriate for displaying the content contemplated by this disclosure. In embodiments, display 125 may include, for example, a light emitting diode (LED) screen, a liquid crystal display (LCD) screen, a cathode ray tube (CRT) screen, an organic light emitting diode (OLED) screen, audio speakers, an interactive touchscreen, or any other visual or audio display.

FIG. 1 is intended to represent the major components of an example computing environment according to embodiments of the present disclosure. In some embodiments, however, individual components can have greater or lesser complexity than shown in FIG. 1, and components other than, or in addition to, those shown in FIG. 1 may be present. For example, validator 123 and sentiment score generator 122 may be embodied in a single module, chip, logic circuit, etc.; storage 126 and data structuring module 121 may be external to cognitive content display device 120 (e.g., provided as a service in a cloud environment and accessed via, for example, network 130); etc. Furthermore, in some embodiments, various components illustrated in FIG. 1 can have greater, lesser, or different functionality than shown in FIG. 1. Further still, aspects of the present disclosure exist comprising only a subset of the components illustrated while remaining within the spirit and scope of the present disclosure.

Figure 2:
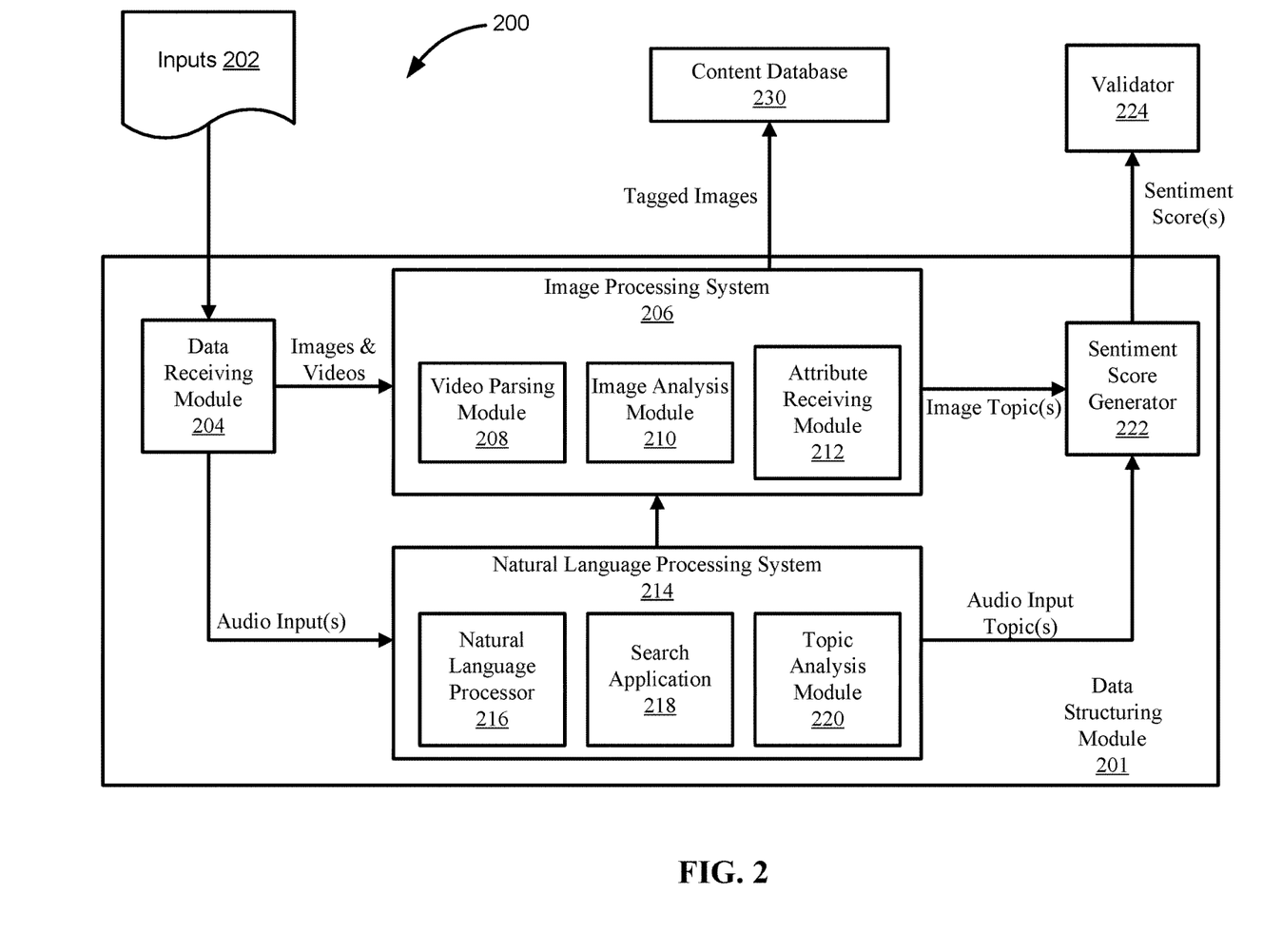
FIG. 2 illustrates a block diagram of an example high level architecture of a system for structuring data inputs for a cognitive content display device, in accordance with embodiments of the present disclosure.

Turning now to FIG. 2, illustrated is a diagram of a data structuring system 200, in accordance with embodiments of the present disclosure. In embodiments, the data structuring module 201, sentiment score generator 222, content database 230, and the validator 224 may be the same as, or substantially similar to, the data structuring module 120, sentiment score generator 122, storage 126, and validator 123 of FIG. 1, respectively. Inputs 202 may be the same as, or substantially similar to, voice input 105 and social media information 135 described in FIG. 1, but may also include content for display on a cognitive content display device. Inputs 202 may be received at a data receiving module 204. The data may include content for display (e.g., images/videos) and/or audio input (e.g., recordings of conversations). The data receiving module 204 may be configured to receive the inputs 202 and to send image(s) and video(s) to the image processing system 206 and audio input to the natural language processing system 214. In embodiments, some inputs (e.g., videos) may contain both images and text; data receiving module 204 may be configured to parse the data to separate the images and text prior to sending the data to the image processing system 206 or to the natural language processing system 214.

The natural language processing system 214 may include, e.g., a natural language processor 216, a search application 218, and a topic analysis module 220. Topic analysis module 220 may include, or store information in, a relational database, triplestore, or text index for identifying terms and phrases associated with topics. The natural language processing system 214 may be configured to analyze audio inputs to identify one or more conversation topics. For example, in embodiments, audio recognition may be employed to identify a term or phrase in the audio input. A superclass for the term or phrase may be determined by parsing a relational database for the term/phrase, and the superclass may be assigned as a conversation topic. After identifying topics, the natural language processing system 214 may transmit the audio input topics to the image processing system 206, as the textual attributes may inform the identification of visual attributes by the image processing system 206. The natural language processing system 214 may also transmit the audio input topics to a sentiment score generator 222. In embodiments, IBM WATSON TONE ANALYZER may be used to identify visitor emotions. Visitor emotions may accompany audio input topics and be factored into sentiment score generation.

In some embodiments, the image processing system 206 may include, e.g., a video parsing module 208, an image analysis module 210, and an attribute receiving module 212. The attribute receiving module 212 may be configured to receive, from the natural language processing system 214, audio input topics identified by analyzing one or more unstructured audio inputs that are related to images/videos received from data receiving module 204. Based on digital file formats (e.g., image file formats (e.g., .jpg) and video file formats (e.g., .wmv)), image processing system 206 may determine with which processing module (e.g., video parsing module 208 or image analysis module 210) the system should use to analyze the image/video received from the data receiving module 204. In embodiments, image processing system 206 may further identify objects within the still images using visual object identification techniques.

In embodiments, video parsing module 208 may be configured to recognize video formats and parse the video into still frame images. In embodiments, a user may select one or more still frame images for processing, or the image processing system 206 may select one or more still frame images for processing. In embodiments, still frame images may be selected at random intervals from the video stream, at regular intervals from the video stream, or a "best image" may be selected according to still image selection criteria. Still frame images may be transmitted to image analysis module 210 for further structuring/processing.

In embodiments, image analysis module 210 may be configured to identify objects within images (e.g., image attributes), and output structured data representations (e.g., machine-readable data) of regarding the images' content. For example, image analysis module 210 may be configured to identify (e.g., from a still image, a video, or a single frame of a video feed), an object or topic (e.g., people, pets, automobiles, buildings, etc.). Image analysis module 210 may further identify, given the combination of objects in the image, the context of the image. For example, an image with a combination of objects including one or more people, a snowy mountain, and a set of skis may provide the basis for identifying the context of the image as a ski trip. Once the objects, attributes, and/or context of an image have been identified, the image may be "tagged" or otherwise annotated with a list or table reflecting this information and stored in content database 230. In embodiments, content database 230 may include a user's photo gallery or other content, and may be a source of image inputs that may be included in inputs 202. In embodiments, image analyses may include building/training image recognition model(s) based on a corpus of pre-processed images, and comparing new images to the model(s) to identify image elements according to similarities with pre-processed images (e.g., best-fit matching). In embodiments, similarity thresholds may be employed to prevent poor matching (e.g., best-fit match may be disregarded if less than 80% similarity to corpus data).

Attribute receiving module 212 may receive audio input attributes identified by the topic analysis module 220. Audio input attributes identified by topic analysis module 220 may be related to the attributes of the images, or video processed by image processing system 206 and displayed on a cognitive content display device. For example, a displayed image may include unidentified persons. Audio inputs received while the image is displayed may provide clues to, or even an outright identification of, the unidentified person(s).

In embodiments, as discussed herein, sentiment score generator 222 may be used to generate sentiment scores based on audio inputs. In addition, sentiment score generator 222 may generate sentiment scores based on images or other information gleaned from a visitor's social media information to predict, or confirm, a visitor's sentiment score for a given topic. In embodiments, sentiment score generator 222 may employ a neural network to generate sentiment scores, as described herein. In embodiments, a neural network may be a multi-layer perceptron, a system of sigmoid neurons, a directed acyclic graph comprising a plurality of corelets, or any other structure/system capable of neural networking.

Sentiment scores from sentiment score generator 222 may be used to validate content at validator 224. Sentiment scores generated from voice inputs may be compared to a sentiment threshold in order to determine whether a visitor had a positive reaction to the content displayed at the time the voice input was received. If the sentiment threshold is met, the content may be considered "validated" for that visitor, and the content may be displayed for a longer amount of time, or it may be displayed more frequently. However, if the threshold is not met, the content may be removed from display, and the visitor's profile may reflect a revocation of viewing privileges for that, and similar, content.

In embodiments, validation may include a preemptive determination of a visitor's viewing privileges. For example, if the owner of the cognitive content display device has indicated, in Visitor C's visitor profile, that they do not wish images of cats to be displayed to Visitor C, then any images in content database 230 that are tagged with a "cat" annotation may be prevented from display while Visitor C is present. In other words, Visitor C will have no viewing privileges for any image tagged with "cat." In embodiments, a preemptive determination of a visitor's viewing privileges may be performed by generating sentiment scores for various topics based on the visitor's social media information, and assigning viewing privileges for content that only includes tags (e.g., of topics) with passing sentiment scores.

In embodiments, validation may further include sentiment confirmation. For example, data structuring module 201 may generate two sentiment scores—one based on voice inputs and one based on a visitor's social media information. The two sentiment scores may be compared at validator 224 to determine whether the voice input-based sentiment score is accurate. If a sentiment confirmation indicates that a voice input-based sentiment score is inaccurate, the corresponding topic may be used to identify content to which the visitor should not have viewing privileges. For example, if a visitor speaks highly of apple pie while near the cognitive content display device, but that visitor's social media information reveals that the visitor actually is disgusted by apple pie, sentiment confirmation may be used to determine that no content featuring apple pie should be displayed while that visitor is present. In effect, the visitor's viewing privileges for content feature apple pie may be revoked.

Figure 3:
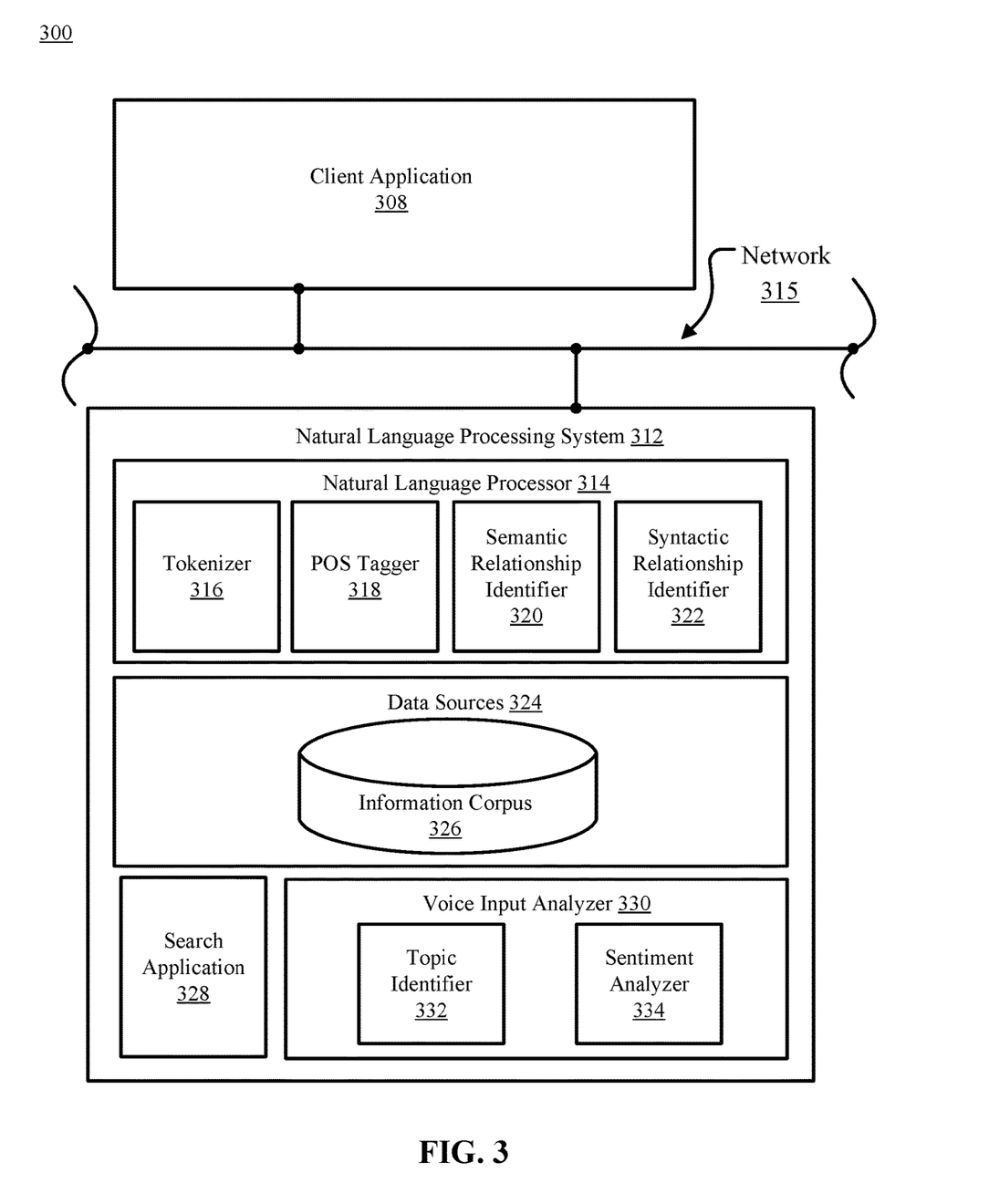
FIG. 3 illustrates a block diagram of an example natural language processing system configured to analyze voice and/or textual inputs, in accordance with embodiments of the present disclosure.

Turning now to FIG. 3, illustrated is a block diagram of an example natural language processing system configured to analyze voice inputs (e.g., local conversations), in accordance with embodiments of the present disclosure. In some embodiments, a cognitive content display device (such as the cognitive content display device 120 of FIG. 1) may receive/detect audio data of local conversations and send them in the form of unstructured textual documents/transcripts (e.g., "electronic documents") to be analyzed by the natural language processing system 312 which may be a standalone device, or part of a larger computer system. Such a natural language processing system 312 may include a client application 308, which may itself involve one or more entities operable to generate or modify information in the unstructured textual document(s) (e.g., analog or electronic textual compositional artifacts) that is then dispatched to a natural language processing system 312 via a network 315.

Consistent with various embodiments, the natural language processing system 312 may respond to electronic document submissions sent by a client application 308. Specifically, the natural language processing system 312 may analyze a received unstructured textual document to identify one or more conversation topics and/or terms reflecting emotional reactions/sentiments associated with the conversation topic(s). In some embodiments, the natural language processing system 312 may include a natural language processor 314, data sources 324, a search application 328, and a voice input analyzer 330. The natural language processor 314 may be a computer module that analyzes the received unstructured textual conversation transcript(s) and other electronic documents. The natural language processor 314 may perform various methods and techniques for analyzing electronic documents (e.g., syntactic analysis, semantic analysis, etc.). The natural language processor 314 may be configured to recognize and analyze any number of natural languages. In some embodiments, the natural language processor 314 may parse passages of the documents. Further, the natural language processor 314 may include various modules to perform analyses of electronic documents. These modules may include, but are not limited to, a tokenizer 316, a part-of-speech (POS) tagger 318, a semantic relationship identifier 320, and a syntactic relationship identifier 322.

In some embodiments, the tokenizer 316 may be a computer module that performs lexical analysis. The tokenizer 316 may convert a sequence of characters into a sequence of tokens. A token may be a string of characters included in an electronic document and categorized as a meaningful symbol. Further, in some embodiments, the tokenizer 316 may identify word boundaries in an electronic document and break any text passages within the document into their component text elements, such as words, multiword tokens, numbers, and punctuation marks. In some embodiments, the tokenizer 316 may receive a string of characters, identify the lexemes in the string, and categorize them into tokens.

Consistent with various embodiments, the POS tagger 318 may be a computer module that marks up a word in passages to correspond to a particular part of speech. The POS tagger 318 may read a passage or other text in natural language and assign a part of speech to each word or other token. The POS tagger 318 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one formula may shed light on the meaning of text elements in another formula). In embodiments, the output of the natural language processing system 312 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In some embodiments, the POS tagger 318 may tag or otherwise annotate tokens of a passage with part of speech categories. In some embodiments, the POS tagger 318 may tag tokens or words of a passage to be parsed by the natural language processing system 312.

In some embodiments, the semantic relationship identifier 320 may be a computer module that may be configured to identify semantic relationships of recognized text elements (e.g., words, phrases) in documents. In some embodiments, the semantic relationship identifier 320 may determine functional dependencies between entities and other semantic relationships.

Consistent with various embodiments, the syntactic relationship identifier 322 may be a computer module that may be configured to identify syntactic relationships in a passage composed of tokens. The syntactic relationship identifier 322 may determine the grammatical structure of sentences such as, for example, which groups of words are associated as phrases and which word is the subject or object of a verb. The syntactic relationship identifier 322 may conform to formal grammar.

In some embodiments, the natural language processor 314 may be a computer module that may parse a document and generate corresponding data structures for one or more portions of the document. For example, in response to receiving an unstructured textual report at the natural language processing system 312, the natural language processor 314 may output parsed text elements from the report as data structures. In some embodiments, a parsed text element may be represented in the form of a parse tree or other graph structure. To generate the parsed text element, the natural language processor 314 may trigger computer modules 316-322.

In some embodiments, the output of natural language processor 314 may be used by search application 328 to perform a search of a set of (e.g., one or more) corpora to retrieve information regarding conversation topics and/or emotional sentiments. As used herein, a corpus may refer to one or more data sources. In some embodiments, the data sources 324 may include data warehouses, information corpora, data models, and document repositories. In some embodiments, the data sources 324 may include an information corpus 326. The information corpus 326 may enable data storage and retrieval. In some embodiments, the information corpus 326 may be a storage mechanism that houses a standardized, consistent, clean, and integrated list of conversation topics and/or emotional sentiments. The information corpus 326 may also store, for each topic/sentiment, a list of associated outcomes, by visitor. For example, the information corpus 326 may include a ranking of conversational topics for each encountered visitor, and/or a visitor profile for each encountered visitor. The data may be sourced from various operational systems. Data stored in the information corpus 326 may be structured in a way to specifically address reporting and analytic requirements. In some embodiments, the information corpus 326 may be a data repository, a relational database, triplestore, or text index.

In some embodiments, the voice input analyzer 330 may be a computer module that identifies conversational topics and visitor sentiments associated with those topics. In some embodiments, the voice input analyzer 330 may include a topic identifier 332 and a sentiment analyzer 334. When an unstructured textual document is received by the natural language processing system 312, the voice input analyzer 330 may be configured to analyze the document using natural language processing to identify one or more conversational topics. The voice input analyzer 330 may first parse the conversation using the natural language processor 314 and related subcomponents 316-322. After parsing the conversation, the topic identifier 332 may identify one or more topics present in the conversation. This may be done, for example, by searching a dictionary (e.g., information corpus 326) using the search application 328.

The sentiment analyzer 334 may determine the sentiment a visitor exhibits for a given conversational topic identified by topic identifier 332. This may be done by using the search application 328 to traverse the various data sources (e.g., the information corpus 326) for information regarding a visitor's reaction to displayed content. The sentiment analyzer 334 may search, using natural language processing, documents from the various data sources for terms related to those detected in the conversation and/or visitor's reaction (e.g., using relational databases, thesauruses, etc.).

Figure 4:
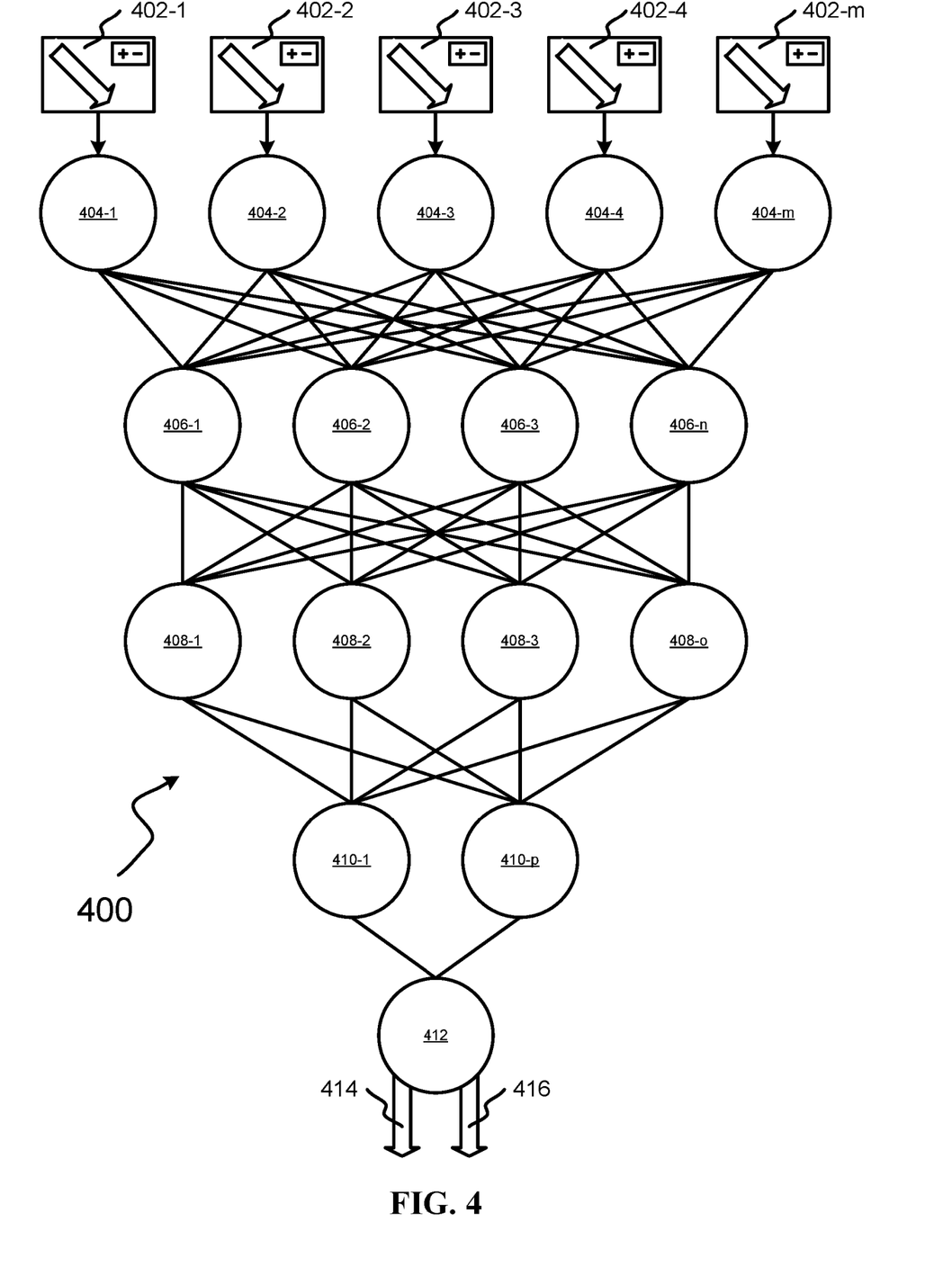
FIG. 4 illustrates an example neural network that may be specialized to process a set of inputs to arrive at a cognitively generated sentiment score, in accordance with embodiments of the present disclosure.

FIG. 4 depicts an example neural network that may be specialized to process a set of inputs to arrive at a cognitively generated sentiment score, in accordance with embodiments of the present disclosure. Inputs may include, for example, data retrieved/received from a data structuring module, such as data structuring module 121 of FIG. 1 or data structuring module 201 of FIG. 2. In embodiments, neural network 400 may be a classifier-type neural network. Neural network 400 may be part of a larger neural network. For example, neural network 400 may be nested within a single, larger neural network, connected to several other neural networks, or connected to several other neural networks as part of an overall aggregate neural network.

Inputs 402-1 through 402-*m* represent the inputs to neural network 400. In this embodiment, 402-1 through 402-*m* do not represent different inputs. Rather, 402-1 through 402-*m* represent the same input that is sent to each first-layer neuron (neurons 404-1 through 404-*m*) in neural network 400. In some embodiments, the number of inputs 402-1 through 402-*m* (i.e., the number represented by m) may equal (and thus be determined by) the number of first-layer neurons in the network. In other embodiments, neural network 400 may incorporate 1 or more bias neurons in the first layer, in which case the number of inputs 402-1 through 402-*m* may equal the number of first-layer neurons in the network minus the number of first-layer bias neurons. In some embodiments, a single input (e.g., input 402-1) may be input into the neural network. In such an embodiment, the first layer of the neural network may comprise a single neuron, which may propagate the input to the second layer of neurons.

Inputs 402-1 through 402-*m* may comprise one or more artifact component(s) and a relative composition that is associated with a compositional artifact. For example, inputs 402-1 through 402-*m* may comprise 10 components with their relative compositions that are associated with a seed artifact. In other embodiments, not all components and their relative compositions may be input into neural network 400. For example, in some embodiments, 30 components may be input into neural network 400, but relative compositions for only 20 components may be input into neural network 400.

Neural network 400 may comprise 5 layers of neurons (referred to as layers 404, 406, 408, 410, and 412, respectively corresponding to illustrated nodes 404-1 to 404-*m*, nodes 406-1 to 406-*n*, nodes 408-1 to 408-*o*, nodes 410-1 to 410-*p*, and node 412). In some embodiments, neural network 400 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 412 is treated as the output layer. Layer 412 outputs a probability that a target event will occur, and contains only one neuron (neuron 412). In other embodiments, layer 412 may contain more than 1 neuron. In this illustration no bias neurons are shown in neural network 400. However, in some embodiments each layer in neural network 400 may contain one or more bias neurons.

Layers 404-412 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the ReLU function. For example, layer 404 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 406, for example, may be a dense layer. In this example, the dense layer may process and reduce the dimensions of the feature vector (e.g., the vector portion of inputs 402-1 through 402-*m*) to eliminate data that is not contributing to the prediction. As a further example, layer 408 may be a "batch normalization" layer. Batch normalization may be used to normalize the outputs of the batch-normalization layer to accelerate learning in the neural network. Layer 410 may be any of a dropout, hidden, or batch-normalization layer. Note that these layers are examples. In other embodiments, any of layers 404 through 410 may be any of dropout, hidden, or batch-normalization layers. This is also true in embodiments with more layers than are illustrated here, or fewer layers.

Layer 412 is the output layer. In this embodiment, neuron 412 produces outputs 414 and 416. Outputs 414 and 416 represent complementary probabilities that a target event will or will not occur. For example, output 414 may represent the probability that a target event will occur, and output 416 may represent the probability that a target event will not occur. In some embodiments, outputs 414 and 416 may each be between 0.0 and 1.0, and may add up to 1.0. In such embodiments, a probability of 1.0 may represent a projected absolute certainty (e.g., if output 414 were 1.0, the projected chance that the target event would occur would be 100%, whereas if output 416 were 1.0, the projected chance that the target event would not occur would be 100%).

FIG. 4 illustrates an example probability-generator neural network with one pattern-recognizer pathway (e.g., a pathway of neurons that processes one set of inputs and analyzes those inputs based on recognized patterns, and produces one set of outputs. However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant. In embodiments, neural network 400 may be trained (e.g., biases and weights among nodes may be calibrated) by inputting feedback and/or input from the owner of the cognitive content display device as described herein, and/or by inputting sentiment scores generated from the reaction of a particular visitor, receiving an output from the neural network, and inputting corrections into the neural network to arrive at an expected output. In embodiments, the impact of the feedback and/or visitor reaction on the weights and biases may lessen over time, in order to correct for emotional fluctuations of the owner/visitor(s). In embodiments, the degradation of the impact may be implemented using a half-life (e.g., the impact degrades by 50% for every time interval of X that has passed) or similar model (e.g., a quarter-life, three-quarter-life, etc.).

Figure 5:
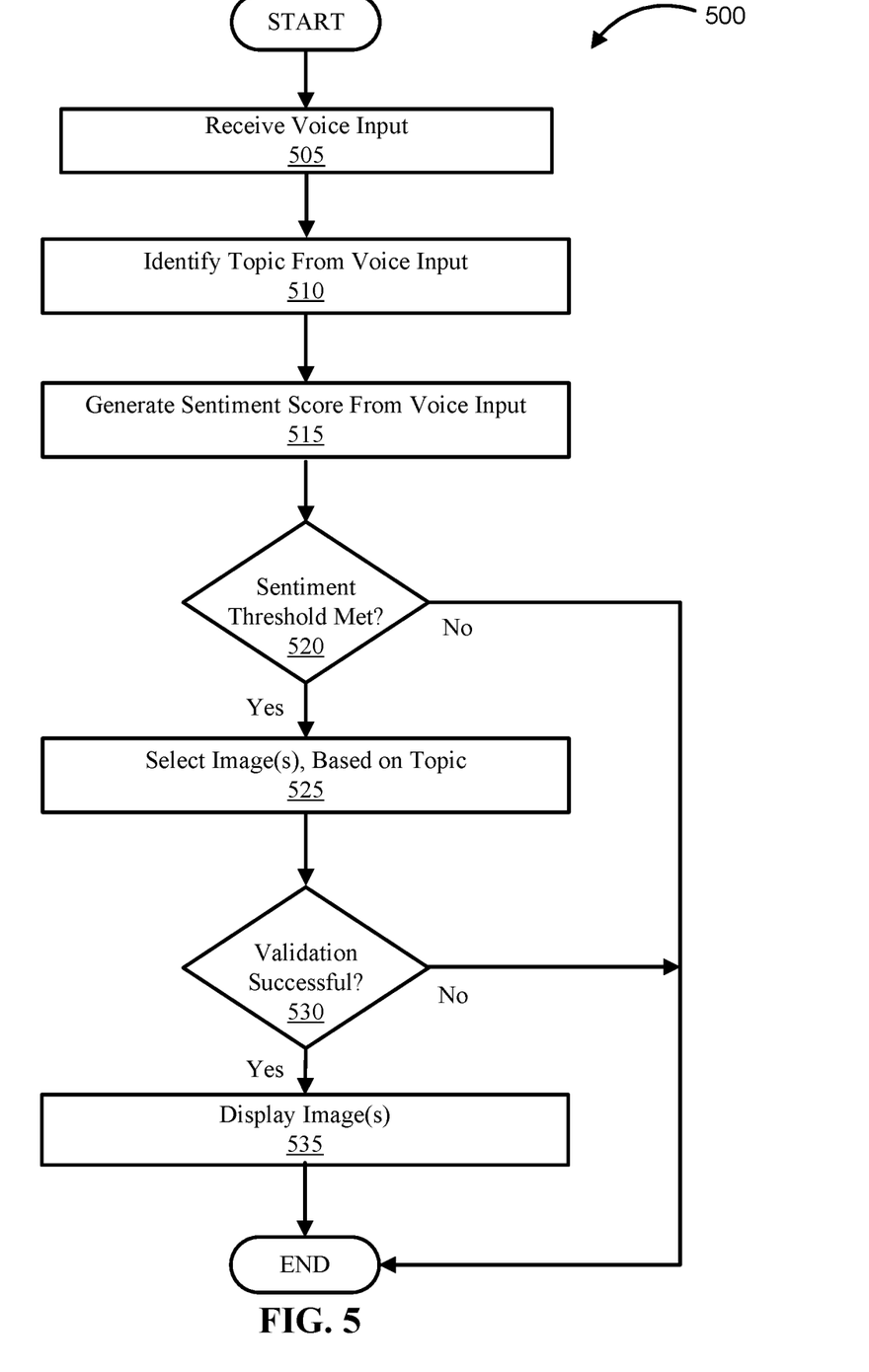
FIG. 5 illustrates a flowchart of a method for validating content, in accordance with embodiments of the present disclosure.

Referring now to FIG. 5, illustrated is a flowchart of a method 500 for validating content, in accordance with embodiments of the present disclosure. At 505, voice input is received. Voice input may include, for example, an audio stream or recording of a conversation occurring nearby a cognitive content display device. In embodiments, voice input may be received on a push/pull bases from another device (e.g., a smartphone, a nearby IoT device, etc.).

At 510, a topic is identified from the voice input. NLP techniques may be performed on the voice input to generate a transcript of nearby conversations. NLP techniques may further identify the topic and tone of the nearby conversations. For example, a conversation transcript may include the following: "You know, I've always enjoyed European buildings. Especially the Byzantine-inspired onion-domed churches of Eastern Europe and the neo-gothic styles of the Czech Republic and Germany." In embodiments, the NLP techniques may generate the textual transcript of the voice input. Additionally, NLP techniques may further be used to determine that the topic of the conversation is Central and Eastern European architecture, and that the tone of the conversation implies a positive sentiment for the topic. In this example, onion-domed churches may be a term or phrase identified from parsing an NLP transcript, and further used to parse a relational database in order to determine a superclass, or conversation topic, of Central and Eastern European architecture.

At 515, a sentiment score is generated from voice input. Voice input may be analyzed, using data structuring techniques and personality insight techniques, such as, for example, IBM WATSON PERSONALITY INSIGHTS, to identify data (e.g., tone words, vocal patterns, etc.) that correlate to, or are associated with, particular emotions associated with conversational topics. In some embodiments, visual data (e.g., facial expressions, gestures, etc.) may be used to enhance sentiment score generation.

At 520, it is determined whether a sentiment threshold has been met. As described herein, a sentiment threshold may be set in advance by an owner of a cognitive content display device, or it may be determined using population averages determined by aggregating sentiment scores from a plurality of visitors. In embodiments, a sentiment threshold may be met when a particular visitor exhibits a positive reaction to displayed content. If, at 520, the sentiment threshold is not met, the process may end.

At 525, content (e.g., an image or set of images) is selected based on the topic identified in the voice input. For example, if voice inputs indicate that the conversation is directed to gemstones, images or other content featuring gemstones (e.g., diamonds, emeralds, rubies, opals, apatite, agate, beryl, sunstones, quartz, etc.) may be selected in contemplation of being displayed, upon proper validation. If, at 525, the content is not validated, the process may end.

At 530, it is determined whether the selected content/ images are validated. For example, each piece of content may be tagged (e.g., annotated) with objects/contexts/topics/ attributes featured within the content, as described herein. These objects/contexts/topics/attributes may be compared against a sentiment score generated from the voice inputs. As long as the sentiment score indicates a positive sentiment for one or more of the objects/contexts/topics/attributes featured in the content, the content may be "validated," and subsequently displayed at 535.

Figure 6:
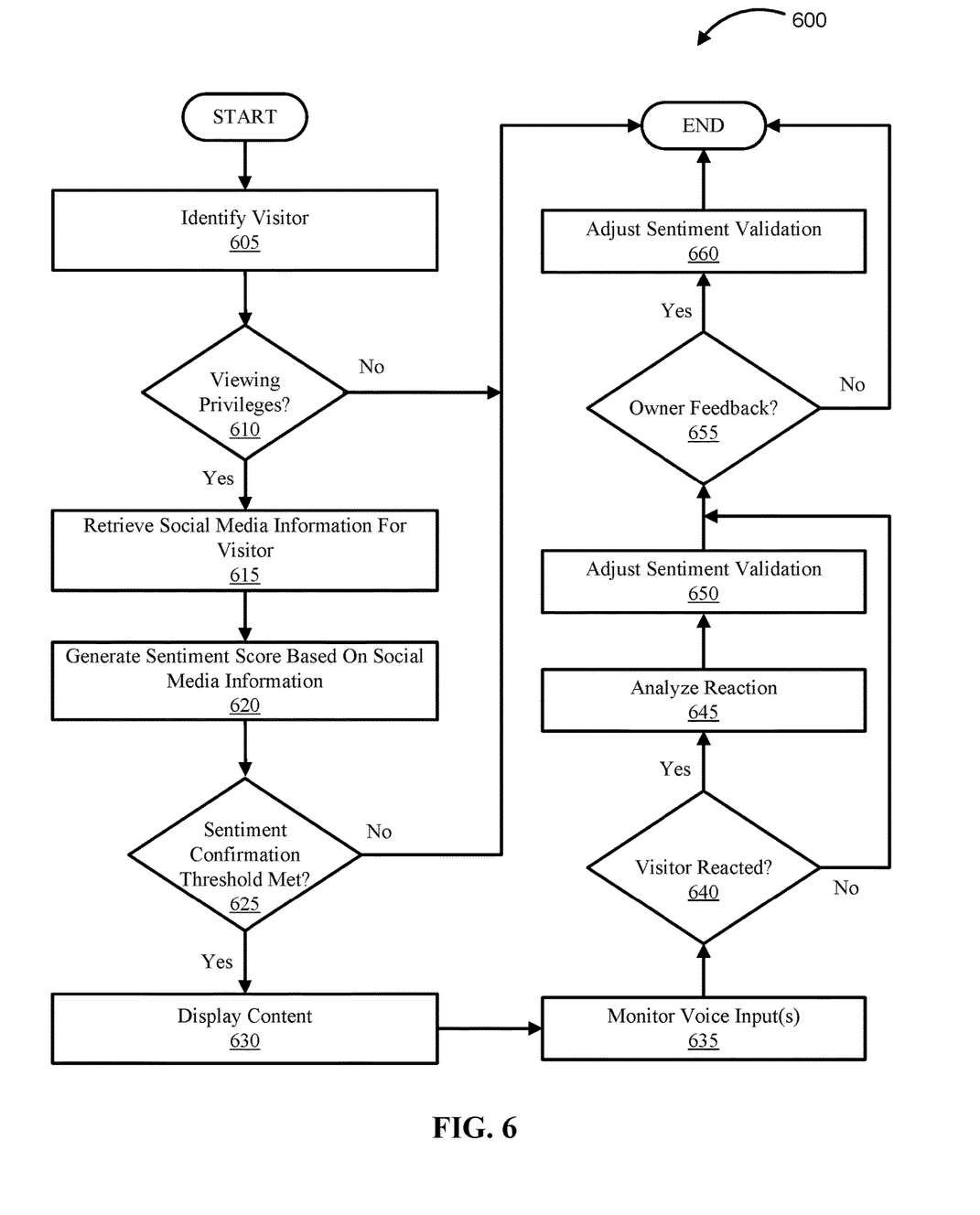
FIG. 6 illustrates a flowchart of a method for sentiment confirmation and validation adjustment, in accordance with embodiments of the present disclosure.

Referring now to FIG. 6, illustrated is a flowchart of a method 600 for sentiment confirmation and validation adjustment, in accordance with embodiments of the present disclosure. At 605, the visitor is identified. In embodiments, this may include, for example, identifying the visitor based on the owner's calendar or appointments, an electronic signature of the visitor, voiceprint identification, visual identification, and/or manual identification by the owner of the cognitive content display device.

At 610, it is determined whether a visitor has viewing privileges for particular content. For example, if the owner has designated that Visitor D does not have privileges to view any content featuring Person A, then any time such a piece of content could be displayed, it will be determined that the visitor does not have sufficient viewing privileges, and the content will be skipped, or otherwise remain undisplayed.

If, at 610, it is determined that the visitor has viewing privileges for the content, the social media information for the visitor may be retrieved. For example, if it is determined that a visitor has viewing privileges for European architecture, then information from the visitor's social media information (e.g., FACEBOOK, TWITTER, INSTAGRAM account content) may be retrieved.

At 620, a sentiment score (e.g., a score indicating a visitor's like or dislike of a topic) may be generated, based on the social media information. For example, content and/or textual posts from the visitor's social media information may be retrieved and analyzed to generate a sentiment score independent from any sentiment score generated based on voice inputs from the visitor.

At 625, it may be determined whether a sentiment score confirmation threshold has been met. For example, the sentiment score generated from the visitor's social media information may be compared to a confirmation threshold to determine the accuracy of the sentiment score generated from the visitor's voice inputs, as described herein.

If, at 625, the sentiment confirmation threshold has been met, the content may be displayed at 630. For example, if the sentiment threshold and confirmation threshold for a particular piece of content have both been met, than that piece of content may be displayed on the cognitive content display device at 630. For example, if it has been determined, by both voice input analysis and social media analysis, that the visitor has a positive sentiment for content featuring elephants, then any elephant-featuring content, so long as it lacks any topics for which the user has a distinct negative sentiment, may be displayed on the cognitive display device.

At 635, voice inputs are further monitored. For example, the cognitive display device may further monitor a visitor's voice inputs made in response to a display of a particular piece of content. In other words, the cognitive display device may continue to monitor ambient conversations, even after a confirmation sentiment threshold has been met and content has been displayed.

At 640, it is determined whether the visitor reacted. In embodiments, NLP techniques may be employed to determine whether a visitor commented on a particular piece of content, whether the visitor's emotions or conversational tone has shifted subsequent to the display of a piece of content, etc. In embodiments, the comment and/or emotional/tone shift may be made within a particular period of time from when a piece of content was displayed, or, in order to be counted as a reaction, it may be required for the comment/shift to be made during the time when the piece of content is displayed on the cognitive content display device. In embodiments, the owner of the cognitive content display device may be able to select or determine the time interval for the comment/shift.

If, at 640, it is determined that the visitor reacted to the displayed content, the reaction is analyzed at 645. NLP techniques, in conjunction with IBM WATSON PERSONALITY INSIGHTS, may be used to determine whether a visitor's sentiment/emotional state has shifted enough to be classified as a "reaction." In some embodiments, a reaction may be directly identified based on the transcript of monitored voice inputs.

At 650, sentiment validation may be adjusted, according to the visitor's reaction. For example, if a visitor reacts strongly to a piece of displayed content, it may be inferred that the validation (e.g., the distance metrics algorithm or other validation algorithm) and/or sentiment score generation algorithms (e.g., the neural network weights/biases) should be adjusted to more accurately reflect the visitor's sentiment for the topic embodied by the displayed content. In embodiments, the stronger the reaction to the displayed content, the greater the adjustment to the algorithm(s). Reaction strength may be determined based on visual features (e.g., facial feature analyses, gesture analyses, etc.) and/or audio features (e.g., the connotation of phrases/words used).

At 655, it may be determined whether the owner of the cognitive display device has submitted feedback. For example, the owner may be pleased/displeased with the displayed content, and may submit, for example, a star-rating indicating the degree of satisfaction the owner experienced with the displayed content.

If, at 655, the owner of the device has submitted feedback, the sentiment validation may be adjusted at 660. This may be substantially similar to the sentiment validation adjustment performed at 650 in response to a visitor's reaction.

Figure 7:
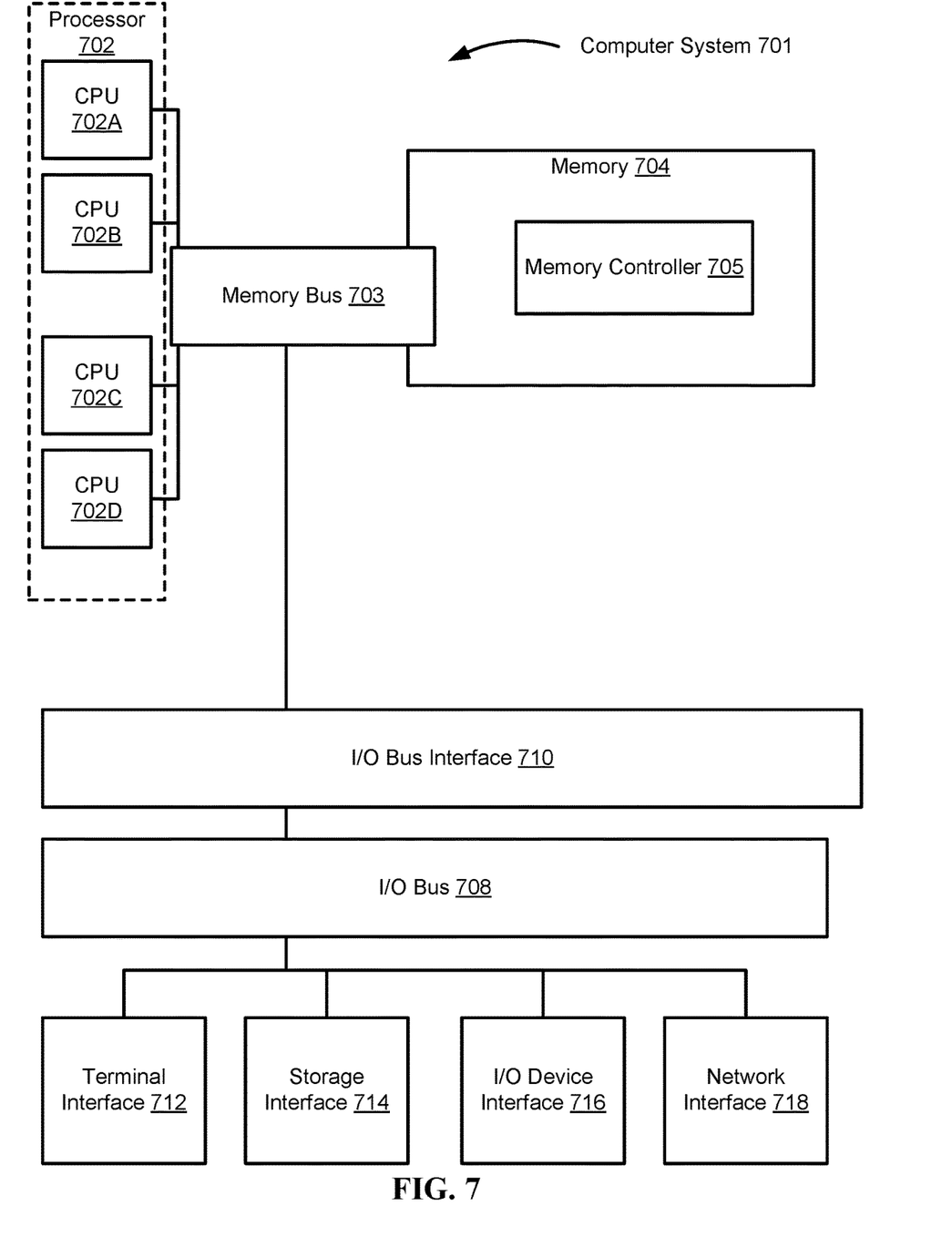
FIG. 7 illustrates a high-level block diagram of an example computer system that may be used in implementing embodiments of the present disclosure.

Referring now to FIG. 7, shown is a high-level block diagram of an example computer system (e.g., cognitive content display device 120 of FIG. 1 and/or data structuring module 201 of FIG. 2) 701 that may be configured to perform various aspects of the present disclosure, including, for example, methods 500 and 600, described in FIGS. 5 and 6, respectively. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for customized image selection and display, comprising:
 receiving a voice input;
 identifying, from the voice input, a topic;
 generating, using sentiment analysis on the voice input, a first sentiment score for the topic, wherein the sentiment score reflects a reaction by the first user to the topic;
 determining, based on the first sentiment score, a sentiment threshold has been met;
 selecting, based on the topic, one or more images from an image database;
 validating the one or more images; and
 displaying, in response to the validating, the one or more images on a display device.

2. The method of claim 1, further comprising:
 receiving, from a second user, feedback associated with one or more displayed images; and
 adjusting the validation of the one or more displayed images.

3. The method of claim 1, further comprising:
 receiving a second voice input from the first user, in response to the displaying of the one or more images;
 generating, based on the second voice input, a second sentiment score; and adjusting the validation of the one or more displayed images.

4. The method of claim 1, wherein selecting the one or more images in the image database comprises searching the image database for images with a metadata tag that matches the topic.

5. The method of claim 1, wherein validating the one or more images comprises:
   identifying the first user;
   determining, based on comparing the identification to a control filter, the first user has insufficient viewing privileges for the one or more images; and
   preventing the one or more images from being displayed on the display device while the first user is present.

6. The method of claim 5, wherein validating the one or more images further comprises:
   generating, based on social media information associated with the first user, a third sentiment score;
   determining, based on the third sentiment score, a sentiment confirmation threshold has been met; and
   displaying the one or more images on the display device.

7. The method of claim 4, wherein image analysis techniques are used to automatically populate metadata tags for the one or more images.

8. The method of claim 5, wherein identifying the first user includes identifying an electronic signature associated with the first user.

9. The method of claim 2, wherein the adjusting the validation includes adjusting a weight and a bias of one or more neural network edges.

10. A system for customized image selection and display, comprising:
    a memory; and
    a processor in communication with the memory, wherein the computer system is configured to:
        receive a voice input;
        identify, from the voice input, a topic;
        generate, using sentiment analysis on the voice input, a first sentiment score for the topic, wherein the sentiment score reflects a first user's reaction to the topic;
        determine, based on the first sentiment score, a sentiment threshold has been met;
        select, based on the topic, one or more images from an image database;
        validate the one or more images; and
        display, in response to the validating, the one or more images on a display device.

11. The system of claim 10, wherein the computer system is further configured to:
    receive, from a second user, feedback associated with one or more displayed images; and
    adjust the validation of the one or more displayed images.

12. The system of claim 10, wherein the computer system is further configured to:
    receive a second voice input from the first user, in response to the displaying of the one or more images;
    generate, based on the second voice input, a second sentiment score; and
    adjust the validation of the one or more displayed images.

13. The system of claim 10, wherein selecting the one or more images in the image database comprises searching the image database for images with a metadata tag that matches the topic.

14. The system of claim 10, wherein validating the one or more images comprises:
    identifying the first user;
    determining, based on comparing the identification to a control filter, the first user has insufficient viewing privileges for the one or more images; and
    preventing the one or more images from being displayed on the display device while the first user is present.

15. The system of claim 14, wherein validating the one or more images further comprises:
    generating, based on social media information associated with the first user, a third sentiment score;
    determining, based on the third sentiment score, a sentiment confirmation threshold has been met; and
    displaying the one or more images on the display device.

16. A computer program product for customized image selection and display, the computer program product comprising a computer readable storage medium having program instructions embodied therewith, the program instructions executable by a device to cause the device to:
    receive a voice input;
    identify, from the voice input, a topic;
    generate, using sentiment analysis on the voice input, a first sentiment score for the topic, wherein the sentiment score reflects a first user's reaction to the topic;
    determine, based on the first sentiment score, a sentiment threshold has been met;
    select, based on the topic, one or more images from an image database;
    validate the one or more images; and
    display, in response to the validating, the one or more images on a display device.

17. The computer program product of claim 16, wherein the program instructions further cause the device to:
    receive a second voice input from the first user, in response to the displaying of the one or more images;
    generate, based on the second voice input, a second sentiment score; and
    adjust the validation of the one or more displayed images.

18. The computer program product of claim 16, wherein selecting the one or more images in the image database comprises searching the image database for images with a metadata tag that matches the topic.

19. The computer program product of claim 16, wherein validating the one or more images comprises:
    identifying the first user;
    determining, based on comparing the identification to a control filter, the first user has insufficient viewing privileges for the one or more images; and
    preventing the one or more images from being displayed on the display device while the first user is present.

20. The computer program product of claim 19, wherein validating the one or more images further comprises:
    generating, based on social media information associated with the first user, a third sentiment score;
    determining, based on the third sentiment score, a sentiment confirmation threshold has been met; and
    displaying the one or more images on the display device.

* * * * *